United States Patent [19]

Takeuti et al.

[11] 4,145,722
[45] Mar. 20, 1979

[54] IMAGE PICKUP TUBE DEVICES

[75] Inventors: Fumihide Takeuti; Toru Takigawa, both of Mobara; Kenichi Takada, Sendai, all of Japan

[73] Assignee: Hitachi, Ltd., Tokyo, Japan

[21] Appl. No.: 810,608

[22] Filed: Jun. 27, 1977

[30] Foreign Application Priority Data

Jun. 28, 1976 [JP] Japan .................................. 51-75548

[51] Int. Cl.² ............................................. H04N 5/21
[52] U.S. Cl. ................................................... 358/223
[58] Field of Search ............... 358/209, 217, 219, 223, 358/905, 50, 55, 229

[56] References Cited

U.S. PATENT DOCUMENTS

| | | | |
|---|---|---|---|
| 3,590,145 | 6/1971 | Schneider et al. | 358/223 X |
| 3,600,520 | 8/1971 | Slark | 358/223 |
| 4,031,551 | 6/1977 | Nobutoki et al. | 358/223 |
| 4,085,419 | 4/1978 | Sekiguchi | 358/223 X |

FOREIGN PATENT DOCUMENTS

2607728 2/1976 Fed. Rep. of Germany ........... 358/229

*Primary Examiner*—Richard Murray
*Assistant Examiner*—Aristotelis M. Psitos
*Attorney, Agent, or Firm*—Charles E. Pfund

[57] ABSTRACT

In an image pickup tube device of the class comprising an image pickup tube including a face plate and a coil assembly surrounding the tube and a bias light source device including a plurality of luminous elements mounted in a hollow circular disc shaped frame, the frame is positioned in coaxial relationship with respect to the image pickup tube device by a recess provided for the frame for receiving the face plate, an annular projection at one end of the coil assembly for receiving the frame, or both.

5 Claims, 5 Drawing Figures

IMAGE PICKUP TUBE DEVICES

BACKGROUND OF THE INVENTION

This invention relates to an image pickup tube device and more particularly to a combination comprising an image pickup tube including a coil assembly and a bias light source device in which a plurality of light sources are disposed in a ring form.

A photoconductor type image pickup tube accompanies a phenomenon generally termed residual image in which the follow up of an electrical signal slightly lags with respect to the variation in an optical signal, thus degrading the quality of the reproduced television picture. It is well known that such a residual image can be alleviated by constantly applying a definite bias light to the image pickup tube.

According to one example of the prior art bias light device, a half mirror which is inclined 45° with respect to the optical axis is disposed in front of an optical lens constituting an optical system in front of the face plate of an image pickup tube so as to reflect in the direction of the optical axis the light from a light source positioned in a direction perpendicular to the optical axis, thereby causing the reflected light to impinge upon the face plate to act as the bias light. With this construction, the bias light distribution is such that the light intensity is high at the center of the face plate but decreases toward the periphery thereof.

In an improved bias light source device disclosed in Japanese patent application No. 69539 of 1975 filed by the same applicant but not laid open to public, a plurality of luminous elements are arranged on a circle adjacent to the face plate of an image pickup tube. In this arrangement, it is essential that the axis of the light source device should coincides with the axis of the image pickup tube and that these axes should not incline with respect to each other. Furthermore, such coaxial relation should not be disturbed by external vibration.

However, since the image pickup tube device disclosed in the above-mentioned Japanese patent application is not provided with any effective means for solving these problems, both axes become eccentric or inclined with the result that the distribution of the bias light on the face plate becomes irregular, giving rise to irregularity of the photoelectric signal.

SUMMARY OF THE INVENTION

Accordingly, it is the principal object of this invention to provide a novel image pickup tube device capable of eliminating the formation of residual image and irregular photoelectric signal current.

Another object of this invention is to provide an improved combination of an image pickup tube and a bias light source device capable of positioning the bias light source to a predetermined position with respect to the image pickup tube.

According to this invention there is provided an image pickup tube device of the type comprising an image pickup tube having a face plate at one end and a coil assembly surrounding the tube, and a bias light source device including a plurality of luminous elements mounted in a hollow circular disc shaped frame for irradiating the face plate, characterized by recess means for positioning the frame in coaxial relationship with respect to the image pickup tube device.

The recess means may be a recess provided for the frame for snugly receiving the face plate, a recess defined by a circular projection provided for the coil assembly for snugly receiving the frame of the bias light source device, or both of the former and latter recesses.

DESCRIPTION OF THE PREFERRED EMBODIMENTS

Figure 1:
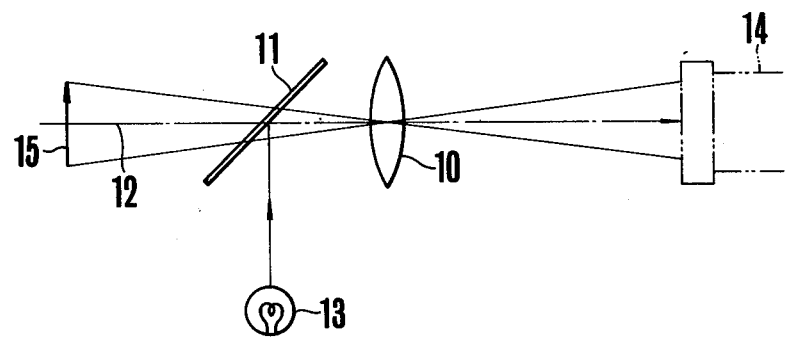
FIG. 1 is a diagrammatic representation of one example of prior art bias light device.

One example of prior art bias light device diagrammatically shown in FIG. 1 comprises a half mirror 11 disposed in front of an optical lens 10. The half mirror 11 is inclined 45° with respect to the optical axis 12 of the optical system including the lens 10. A light source 13 is disposed in a direction perpendicular to the optical axis 12 for supplying bias light to an image pickup tube 14 indicated by dot and dash lines. The light from the light source 13 is reflected by the half mirror 11 to travel along the optical axis 12 toward the image pickup tube 14 as shown by arrows. The light from an object 15 transmitting through the half mirror 11 is focussed by the lens 10 and then it impinges upon the image pickup tube 14 whereby the object 15 is picked up under an optically biased condition. However, since the light source 13 can be considered as a point light source, a high intensity bias is provided at the central portion of the image pickup tube but the intensity of the bias light decreases toward the periphery so that it is impossible to obtain uniform bias light.

Figure 2:
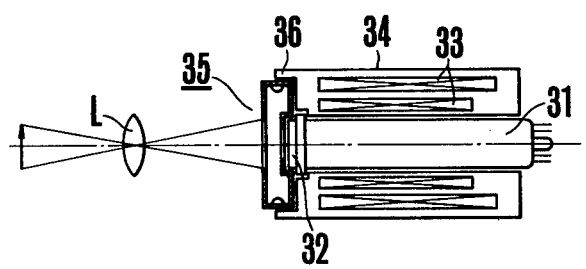
FIG. 2 is a longitudinal sectional view showing one embodiment of the image pickup tube device embodying the invention.

One embodiment of this invention will now be described with reference to FIG. 2. The image pickup tube 31 shown therein comprises a face plate 32 at one end, and a coil assembly 34 surrounding the tube and including deflection coils 33. In front of the face plate 32 is disposed a bias light source device 35, so that an image of an object is projected on the face plate 32 through a lens L together with the light from the bias light source.

For the purpose of clearly understanding the arrangement of various component parts, the image pickup tube 31 is shown as spaced from the coil assembly and the bias light source 35 in FIGS. 2 through 5 but actually, the coil assembly and the bias light source are mounted on the image pickup tube with a spacing of less than 0.2 mm. The coil assembly 34 is formed by embedding deflection coils 33 in such hard resin as epoxide or phenol resin.

Figure 3:
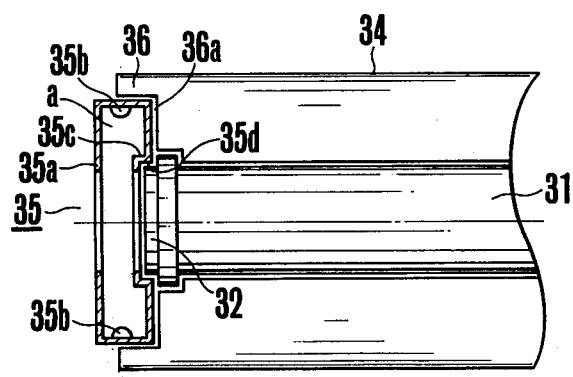
FIG. 3 is an enlarged view of a portion of the image pickup tube device shown in FIG. 2.

As shown in FIG. 3, the bias light source device 35 comprises a hollow disc shaped frame 35a and a plurality of luminous elements 35b mounted on the annular inner wall of the frame 35a. The frame 35a is provided with a shoulder 35c defining a recess 35d on one side thereof facing the face plate 32. The inner diameter of the shoulder 35c is made to be substantially equal to the outer diameter of the face plate so as to snugly receive the same. The coil assembly 34 is provided with an axial projection 36 defining a recess 36a for receiving the frame 35a.

The luminous elements 35b may be ordinary incandescent lamps but it is advantageous to use luminous diodes. For instance, a satisfactory result was obtained by using light luminous diodes each having a diameter of about 3 mm for the tube diameter of 18 mm, face plate diameter of 18 mm, frame outer diameter of 34 mm and frame height of 7 mm. When more than eight luminous diodes are used, the difference in the amount of light emitted by respective luminous diodes results in an adverse effect. Further, it is advantageous to fit the face plate in the recess 35d with a clearance of less than 0.2 mm for the purpose of preventing inclination.

With this construction, it is possible to readily and simply position the bias light source device 35 with respect to the image pickup tube by merely fitting the face plate in the recess 35d and the frame 35a in the recess 36a. By suitably selecting the dimensions of the recesses 35d and 36a, it is possible to correctly align the axis of the bias light source device 35 with the axis of the image pickup tube when the device 35 is mounted on the tube. When the bias light source device 35 is secured to the coil assembly 34 by means of set screws or a bonding agent, the coaxial relationship would not be impared by vibration or shock applied to a television camera while it is used, whereby it is always possible to irradiate uniform bias light on the face plate.

It will be clear that, the projection 36 is not always required to be annular, but a series of projections may be arranged along a circle.

Figure 4:
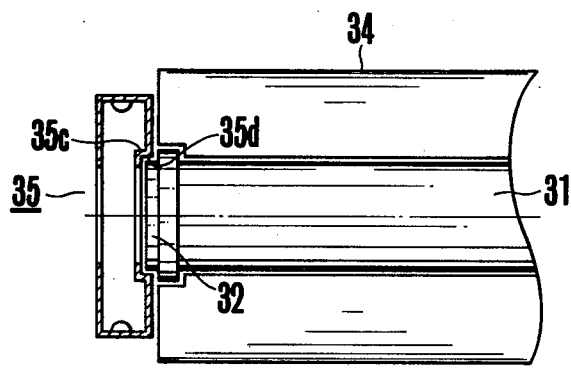
FIGS. 4 and 5 are sectional views respectively showing other embodiments of this invention.

In a modification shown in FIG. 4, the projection 36 of the coil assembly 34 is eliminated but the bias light source device 35 is positioned by merely fitting the face plate 32 in the recess 35d inside the shoulder 35c. Even with this simplified construction, substantially the same effect as the first embodiment can be obtained.

Figure 5:
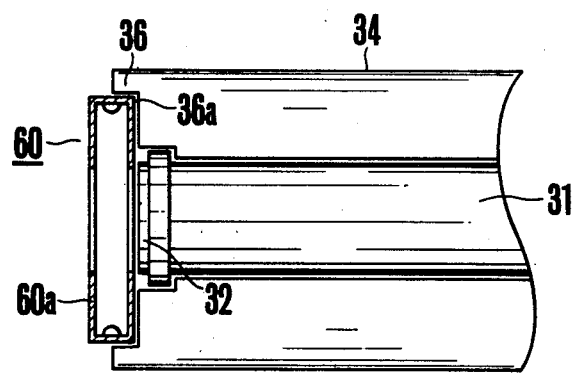

FIG. 5 shows still another embodiment of this invention which is different from that shown in FIG. 4 in that the bias light source device 60 is positioned in a recess 36a defined by the projection 36 of the coil assembly 34. With this construction, it is not necessary to provide a recess for the frame 60a to receive the face plate 32. Again it is possible to secure the frame 60a to the coil assembly 34 by screws or bonding agent.

As described above, according to this invention, it is possible to simply mount the bias light source device on the image pickup tube at a correct position by providing a recess for the frame containing the bias light source for receiving the face plate of an image pickup tube or by providing a projection for the coil assembly of the image pickup tube for receiving the frame of bias light source device.

What is claimed is:

1. In an image pickup tube device of the type comprising an image pickup tube having a face plate at one end and a coil assembly surrounding said tube concentrically therewith with a small clearance therebetween, and a bias light source device including a plurality of luminous elements mounted in a hollow circular disc shaped frame for irradiating said face plate with bias light, the improvement wherein said frame has a first circular recess on one side thereof facing the face plate for snugly receiving said face plate such that said frame may be mounted directly to said face plate in coaxial relationship with respect to said image pickup tube.

2. The improvement according to claim 1 which further comprises a second circular recess defined by an annular projection formed on one end of said coil assembly for receiving said frame.

3. The improvement according to claim 2 wherein said projection comprises a series of projections arranged on a circle.

4. In an image pickup tube device of the type comprising an image pickup tube having a face plate at one end and a coil assembly surrounding said tube concentrically therewith with a small clearance therebetween, and a bias light source device including a plurality of luminous elements mounted in a hollow circular disc shaped frame for irradiating said face plate with bias light, the improvement which comprises a circular recess defined by an annular projection formed on the front end of said coil assembly for snugly receiving said frame such that said frame may be mounted directly to said coil assembly in coaxial relationship with respect to said image pickup tube.

5. The improvement according to claim 4 wherein said projection comprises a series of projections arranged on a circle.

* * * * *